(12) United States Patent
Sakae et al.

(10) Patent No.: US 11,015,852 B2
(45) Date of Patent: May 25, 2021

(54) REFRIGERATION APPARATUS

(71) Applicant: DAIKIN INDUSTRIES, LTD., Osaka (JP)

(72) Inventors: Satoru Sakae, Osaka (JP); Azuma Kondou, Osaka (JP); Masaaki Takegami, Osaka (JP); Kazuyoshi Nomura, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 62 days.

(21) Appl. No.: 16/329,972

(22) PCT Filed: Sep. 1, 2017

(86) PCT No.: PCT/JP2017/031657
§ 371 (c)(1),
(2) Date: Mar. 1, 2019

(87) PCT Pub. No.: WO2018/043721
PCT Pub. Date: Mar. 8, 2018

(65) Prior Publication Data
US 2019/0203997 A1    Jul. 4, 2019

(30) Foreign Application Priority Data

Sep. 2, 2016   (JP) .............................. JP2016-172010

(51) Int. Cl.
*F25B 49/02*   (2006.01)
*F25B 1/00*    (2006.01)

(52) U.S. Cl.
CPC .............. *F25B 49/022* (2013.01); *F25B 1/00* (2013.01); *F25B 49/02* (2013.01);
(Continued)

(58) Field of Classification Search
CPC .. F25B 49/02; F25B 49/022; F25B 2313/023; F25B 2313/0233; F25B 2500/222;
(Continued)

(56) References Cited

U.S. PATENT DOCUMENTS

| 6,701,722 B1* | 3/2004 | Seo .................. F25B 13/00 62/129 |
| 2013/0014525 A1* | 1/2013 | Koge .................. F24F 1/32 62/126 |

(Continued)

FOREIGN PATENT DOCUMENTS

| EP | 2905563 A1 | 8/2015 |
| EP | 3418655 A1 | 12/2018 |

(Continued)

OTHER PUBLICATIONS

Extended European Search Report, dated Mar. 19, 2020, for European Application No. 17846724.7.

*Primary Examiner* — Marc E Norman
(74) *Attorney, Agent, or Firm* — Birch, Stewart, Kolasch & Birch, LLP

(57) ABSTRACT

Provided is a refrigeration apparatus capable of, even in occurrence of a refrigerant leak, suppressing the extent of the refrigerant leak in continuously operating a usage unit other than a usage unit at which the refrigerant leak occurs. When one of a first usage unit and a second usage unit connected in parallel via a liquid-refrigerant connection pipe and a gas-refrigerant connection pipe is in a refrigerant leak situation satisfying a predetermined condition, a controller closes an on-off valve of a leak unit, the on-off valve being disposed on the side of the liquid-refrigerant connection pipe with respect to a usage-side heat exchanger, continues to open an on-off valve of a non-leak unit, the on-off valve being disposed on the side of the liquid-refrigerant connection pipe with respect to a usage-side heat exchanger, and (Continued)

reduces a refrigerant pressure at a portion on the side of the liquid-refrigerant connection pipe with respect to each on-off valve below a refrigerant pressure at the portion at a time when the refrigerant leak situation satisfies the predetermined condition.

4 Claims, 6 Drawing Sheets

(52) U.S. Cl.
 CPC . *F25B 2500/222* (2013.01); *F25B 2600/0253* (2013.01); *F25B 2600/111* (2013.01); *F25B 2600/2513* (2013.01)

(58) Field of Classification Search
 CPC ........ F25B 2600/0253; F25B 2600/111; F25B 2600/2513; F25B 2700/191; F25B 2700/197

USPC .................................................. 62/199, 200
 See application file for complete search history.

(56) References Cited

U.S. PATENT DOCUMENTS

| | | | |
|---|---|---|---|
| 2015/0233622 A1* | 8/2015 | Yajima | F25B 49/005 |
| | | | 62/129 |
| 2018/0180338 A1* | 6/2018 | Honda | F24F 11/89 |
| 2019/0226705 A1* | 7/2019 | Sakae | F25B 49/02 |

FOREIGN PATENT DOCUMENTS

| | | |
|---|---|---|
| GB | 2315299 A | 1/1998 |
| JP | 5-118720 A | 5/1993 |
| JP | 2002-228281 A | 8/2002 |
| JP | 2016/35355 A | 3/2016 |

* cited by examiner

REFRIGERATION APPARATUS

TECHNICAL FIELD

The present invention relates to a refrigeration apparatus.

BACKGROUND ART

In a refrigeration cycle using a refrigerant circuit including a compressor, a heat source-side heat exchanger, an expansion valve, and a usage-side heat exchanger that are interconnected, heretofore, a refrigerant leak has sometimes occurred at the usage-side heat exchanger and its vicinity for any reason.

In this respect, for example, Patent Literature 1 (JP 2002-228281 A) discloses a technique of, upon detection of a refrigerant leak, controlling a compressor and valves to automatically operate a pump down operation, and recovering a refrigerant into the heat source-side heat exchanger, thereby suppressing the refrigerant leak into a space where a usage-side heat exchanger is placed, as much as possible.

SUMMARY OF THE INVENTION

Technical Problem

As to a refrigerant circuit including a plurality of usage-side heat exchangers that are interconnected, for example, if a refrigerant leak occurs at one of the usage-side heat exchangers, it has been considered to close a valve on a passage for supplying a refrigerant to the usage-side heat exchanger at which the refrigerant leak occurs, and to allow the refrigerant to continuously circulate through the remaining usage-side heat exchangers at which no refrigerant leak occurs.

This configuration suppresses the refrigerant leak at the leak spot, and continues temperature control by the remaining usage-side heat exchangers at which no refrigerant leak occurs.

In the case of closing the valve on the passage for supplying the refrigerant to the usage-side heat exchanger at which the refrigerant leak occurs, however, the valve may not be completely closed, resulting in a slight clearance at the valve. In such a case, when the compressor is continuously driven after the occurrence of the refrigerant leak, a refrigerant pressure is continuously applied to the closed valve, which may allow the refrigerant to pass through the clearance at the valve. The amount of the refrigerant passing through the clearance at the valve increases as the refrigerant pressure to be applied to the valve is high.

In view of the aspects described above, the present invention provides a refrigeration apparatus capable of, even in occurrence of a refrigerant leak, suppressing the extent of the refrigerant leak in continuously operating a usage unit other than a usage unit at which the refrigerant leak occurs.

Solutions to Problem

According to a first aspect, a refrigeration apparatus includes a heat source unit, a plurality of usage units, and a controller. The heat source unit includes a compressor and a heat source-side heat exchanger. The usage units are connected to the heat source unit in parallel via a liquid-refrigerant connection pipe and a gas-refrigerant connection pipe. Each of the usage units includes a usage-side heat exchanger and a usage-side valve. The usage-side valve is disposed on the side of the liquid-refrigerant connection pipe with respect to the usage-side heat exchanger. When one of the usage units is in a refrigerant leak situation satisfying a predetermined condition, the controller closes a usage-side valve of a leak unit which is the usage unit satisfying the predetermined condition, continues to open a usage-side valve of a non-leak unit being operated at a time when the leak unit satisfies the predetermined condition among one or more non-leak unit which is the usage unit not satisfying the predetermined condition, and performs pressure control. The controller performs the pressure control to reduce a refrigerant pressure at a portion on the side of the liquid-refrigerant connection pipe with respect to each usage-side valve below a refrigerant pressure at the portion at the time when the leak unit satisfies the predetermined condition.

Examples of the case where the refrigerant leak situation satisfies the predetermined condition may include, but not limited to, a case where a sensor detects that a leakage refrigerant concentration in a usage unit is equal to or more than a predetermined concentration, and a case where a sensor detects a change or reduction in value of a pressure or temperature of a portion, through which a refrigerant flows, of a usage unit.

In the refrigeration apparatus, when one of the usage units is in a refrigerant leak situation satisfying the predetermined condition, the controller closes the usage-side valve of the leak unit. This configuration makes the refrigerant discharged from the compressor and passing through the heat source-side heat exchanger hard to flow toward the usage-side heat exchanger of the leak unit via the usage-side valve, and reduces the leakage of the refrigerant from the leak unit.

In addition, the controller continues to open the usage-side valve of the non-leak unit operated. This configuration avoids circulation of the refrigerant in the leak unit, but allows circulation of the refrigerant in the usage-side heat exchanger of the non-leak unit. Consequently, the usage-side heat exchanger is continuously used as an evaporator for the refrigerant. This configuration therefore causes the non-leak unit to continuously cool a target to be cooled.

In a typical usage-side valve, the valve may not be completely closed even in a fully closed state, and may be slightly opened as unintended in some instances. If the valve is slightly opened as unintended, the refrigerant may pass through the usage-side valve of the leak unit to flow toward the usage-side heat exchanger, so that the refrigerant leak lasts as unintended. The leakage of the refrigerant passing through the usage-side valve of the leak unit tends to increase when a refrigerant pressure at the usage-side valve of the leak unit on the side of the liquid-refrigerant connection pipe is high. In allowing continuous circulation of the refrigerant in the non-leak unit, since the non-leak unit and the leak unit are connected to the heat source unit in parallel, the refrigerant pressure is continuously applied to the usage-side valve of the leak unit on the side of the liquid-refrigerant connection pipe.

In this respect, in the refrigeration apparatus, the controller performs the pressure control to reduce the refrigerant pressure at each usage-side valve on the side of the liquid-refrigerant connection pipe below the refrigerant pressure at the time when the leak unit satisfies the predetermined condition. This configuration therefore reduces the leakage of the refrigerant passing through the usage-side valve of the leak unit while allowing continuous circulation of the refrigerant in the non-leak unit even when the usage-side valve of the leak unit is slightly opened as unintended.

The refrigeration apparatus thus suppresses, even in occurrence of a refrigerant leak, the extent of the refrigerant leak in continuously operating a usage unit other than a usage unit at which the refrigerant leak occurs.

According to a second aspect, in the refrigeration apparatus according to the first aspect, the heat source unit further includes a heat source-side expansion valve configured to reduce a pressure of the refrigerant radiating heat in the heat source-side heat exchanger. The controller performs the pressure control by controlling the heat source-side expansion valve such that an extent of decompression in the heat source-side expansion valve after the leak unit has satisfied the predetermined condition is greater than an extent of decompression in the heat source-side expansion valve at the time when the leak unit satisfies the predetermined condition.

In the refrigeration apparatus, the controller performs the pressure control using the heat source-side expansion valve, thereby reducing the pressure of the refrigerant flowing toward the usage-side heat exchanger after the heat radiation in the heat source-side heat exchanger. This configuration eliminates a necessity of significantly reducing the pressure of the refrigerant flowing through the heat source-side heat exchanger serving as a radiator.

According to a third aspect, the refrigeration apparatus according to the second aspect further includes a subcooling pipe, a subcooling expansion valve, and a subcooling heat exchanger. The subcooling pipe is configured to shunt the refrigerant radiating heat in the heat source-side heat exchanger, from a refrigerant passage through which the refrigerant flows toward each of the usage units, and is configured to guide the refrigerant to the compressor. The subcooling expansion valve is disposed at a middle of the subcooling pipe and is configured to decompress the refrigerant passing therethrough. The subcooling heat exchanger is configured to cause the refrigerant decompressed by the subcooling expansion valve, of the refrigerant flowing through the subcooling pipe, to exchange heat with the refrigerant flowing through the refrigerant passage.

Guiding the refrigerant to the compressor may involve guiding the refrigerant to a suction side of the compressor, and guiding the refrigerant to the compressor in an intermediate state of a compression process.

The refrigeration apparatus subcools the refrigerant flowing toward the heat source-side expansion valve. This configuration therefore suppresses a flush of the refrigerant flowing from the heat source-side expansion valve toward the non-leak unit even when the controller performs the pressure control by reducing the pressure of the refrigerant which has passed through the heat source-side heat exchanger, using the heat source-side expansion valve.

According to a fourth aspect, in the refrigeration apparatus according to the first aspect, the controller performs the pressure control by controlling the compressor such that a driving frequency of the compressor after the leak unit has satisfied the predetermined condition is lower than a driving frequency of the compressor at the time when the leak unit satisfies the predetermined condition.

In the refrigeration apparatus, the controller lowers the driving frequency of the compressor, thereby easily reducing the refrigerant pressure at each usage-side valve on the side of the liquid-refrigerant connection pipe.

According to a fifth aspect, in the refrigeration apparatus according to the first aspect, the heat source unit further includes a heat source-side fan configured to provide an air flow for the heat source-side heat exchanger. The controller performs the pressure control by controlling the heat source-side fan such that an airflow volume of the heat source-side fan after the leak unit has satisfied the predetermined condition is larger than an airflow volume of the heat source-side fan at the time when the leak unit satisfies the predetermined condition.

In the refrigeration apparatus, the controller increases the airflow volume of the heat source-side fan, thereby easily reducing the refrigerant pressure at each usage-side valve on the side of the liquid-refrigerant connection pipe.

Advantageous Effects of Invention

The refrigeration apparatus according to the first aspect suppresses, even in occurrence of a refrigerant leak, the extent of the refrigerant leak in continuously operating a usage unit other than a usage unit at which the refrigerant leak occurs.

The refrigeration apparatus according to the second aspect eliminates a necessity of significantly reducing a pressure of the refrigerant flowing through the heat source-side heat exchanger serving as a radiator.

The refrigeration apparatus according to the third aspect suppresses a flush of the refrigerant flowing from the heat source-side expansion valve toward a non-leak unit.

The refrigeration apparatus according to the fourth aspect easily reduces a refrigerant pressure at each usage-side valve on the side of the liquid-refrigerant connection pipe.

The refrigeration apparatus according to the fifth aspect increases an airflow volume of the heat source-side fan, thereby easily reducing a refrigerant pressure at each usage-side valve on the side of the liquid-refrigerant connection pipe.

DESCRIPTION OF EMBODIMENTS

A refrigeration apparatus 100 according to an embodiment of the present invention will be described below with reference to the drawings. It should be noted that the following embodiments are merely specific examples of the present invention, do not intend to limit the technical scope of the present invention, and may be appropriately modified without departing from the gist of the present invention.

(1) Refrigeration Apparatus 100

Figure 1:
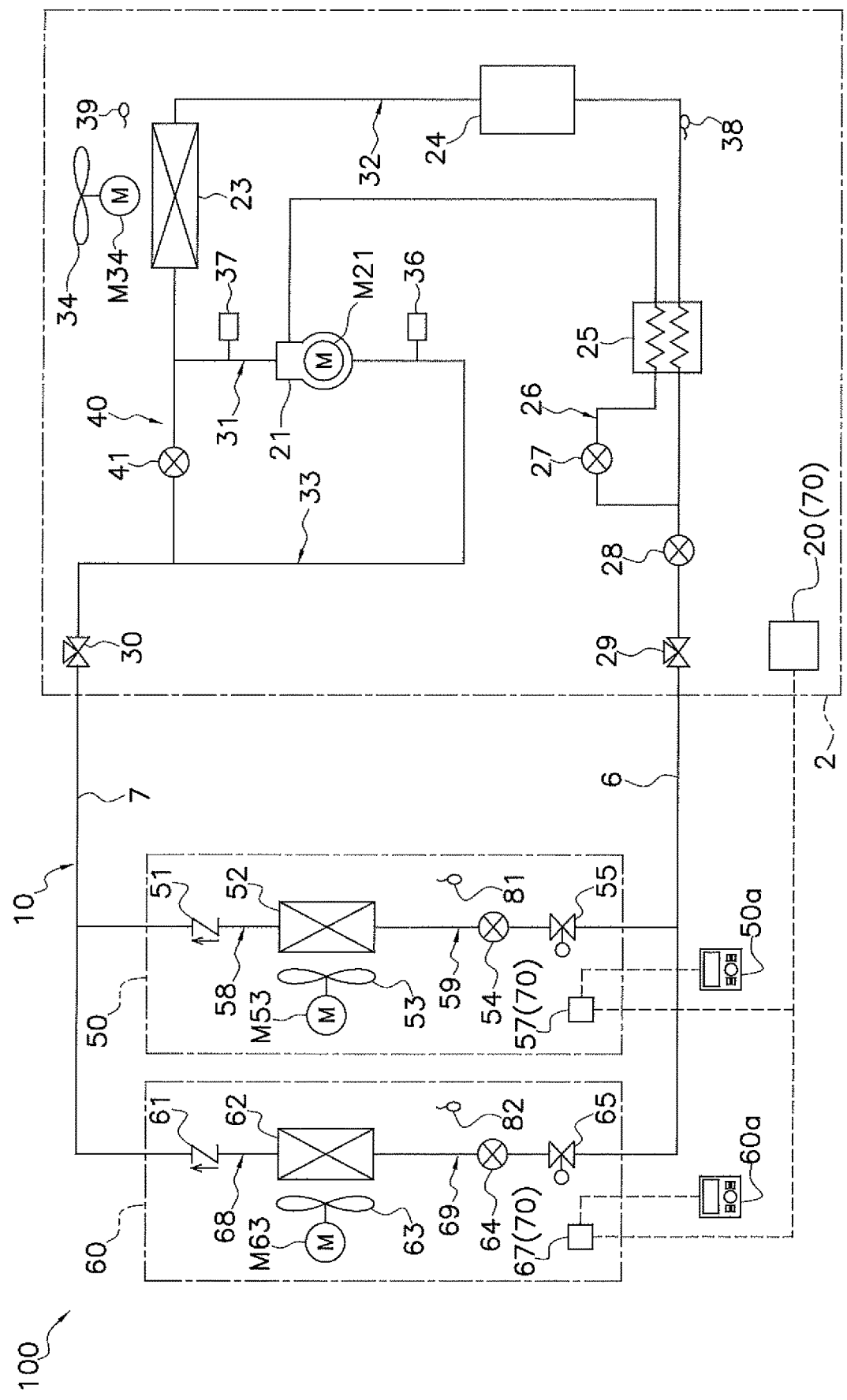
FIG. 1 is a general configuration diagram of a refrigeration apparatus according to an embodiment of the present invention.

FIG. 1 is a schematic configuration diagram of a refrigeration apparatus 100 according to an embodiment of the present invention. The refrigeration apparatus 100 employs a vapor compression refrigeration cycle to cool a usage-side space such as the interior of a cold storage warehouse or the interior of a showcase in a store.

The refrigeration apparatus 100 mainly includes: a heat source unit 2; a plurality of (two in this embodiment) usage units, that is, a first usage unit 50 and a second usage unit 60; a liquid-refrigerant connection pipe 6 and a gas-refrigerant connection pipe 7 each connecting the heat source unit 2 to the first usage unit 50 and the second usage unit 60; a refrigerant leak sensor configured to detect a refrigerant leak in a corresponding one of the usage units, that is, a first refrigerant leak sensor 81 configured to detect a refrigerant leak in the first usage unit 50, and a second refrigerant leak sensor 82 configured to detect a refrigerant leak in the second usage unit 60; a plurality of remote controllers, that is, a first remote controller 50a and a second remote controller 60a each functioning as an input device and a display device; and a controller 70 configured to control operation of the refrigeration apparatus 100.

In the refrigeration apparatus 100, the heat source unit 2 as well as the first usage unit 50 and the second usage unit 60 connected to the heat source unit 2 in parallel via the liquid-refrigerant connection pipe 6 and the gas-refrigerant connection pipe 7 constitute a refrigerant circuit 10. The refrigeration apparatus 100 performs a refrigeration cycle to compress, cool or condense, decompress, heat or evaporate, and then compress again a sealed-in refrigerant in the refrigerant circuit 10. In this embodiment, the refrigerant circuit 10 is filled with R32 as a refrigerant for a vapor compression refrigeration cycle.

(1-1) Heat Source Unit 2

The heat source unit 2, to which the first usage unit 50 and the second usage unit 60 are connected in parallel via the liquid-refrigerant connection pipe 6 and the gas-refrigerant connection pipe 7, constitutes a part of the refrigerant circuit 10. The heat source unit 2 mainly includes a compressor 21, a heat source-side heat exchanger 23, a heat source-side fan 34, a receiver 24, a subcooler 25, a heat source-side expansion valve 28, a hot gas bypass pipe 40, a hot gas bypass valve 41, an injection pipe 26, an injection valve 27, a liquid-side shutoff valve 29, and a gas-side shutoff valve 30.

The heat source unit 2 also includes a discharge-side refrigerant pipe 31, a heat source-side liquid refrigerant pipe 32, and a suction-side refrigerant pipe 33. The discharge-side refrigerant pipe 31 connects a discharge side of the compressor 21 to a gas-side end of the heat source-side heat exchanger 23. The heat source-side liquid refrigerant pipe 32 connects a liquid-side end of the heat source-side heat exchanger 23 to the liquid-refrigerant connection pipe 6. The suction-side refrigerant pipe 33 connects a suction side of the compressor 21 to the gas-refrigerant connection pipe 7.

The heat source unit 2 includes: the hot gas bypass pipe 40 configured to shunt part of the refrigerant flowing through the discharge-side refrigerant pipe 31 back to the suction side of the compressor 21 via the suction-side refrigerant pipe 33; and the hot gas bypass valve 41 disposed at the middle of the hot gas bypass pipe 40.

The heat source unit 2 includes: the injection pipe 26 (a subcooling pipe) configured to shunt part of the refrigerant flowing through the heat source-side liquid refrigerant pipe 32 back to the compressor 21; and the injection valve 27 (a subcooling expansion valve) disposed at the middle of the injection pipe 26. The injection pipe 26 branches off the heat source-side liquid refrigerant pipe 32 at a portion downstream of the subcooler 25, passes through the subcooler 25, and is connected to the compressor 21 in an intermediate state of a compression process.

The compressor 21 is a device configured to change by compression a low-pressure refrigerant to a high-pressure refrigerant in the refrigeration cycle. The compressor 21 used herein is a closed compressor in which a displacement compression element, such as rotary or scroll, (not illustrated) is driven to rotate by a compressor motor M21. Although not illustrated in the drawings, the compressor 21 in this embodiment includes one or more constant-speed compressors and a variable displacement compressor that are connected in parallel. The variable displacement compressor includes the compressor motor M21 and has an operating frequency controllable by an inverter. In decreasing the capacity of the compressor 21, the operating frequency of the variable displacement compressor is lowered. In further decreasing the capacity of the variable displacement compressor even though the operating frequency of the variable displacement compressor has been lowered, the constant-speed compressors are stopped. However, the method of decreasing the capacity is not limited thereto.

The heat source-side heat exchanger 23 functions as a radiator for the high-pressure refrigerant in the refrigeration cycle. The heat source unit 2 includes the heat source-side fan 34 for sucking outside air (heat source-side air) into the heat source unit 2, causing the heat source-side air to exchange heat with the refrigerant in the heat source-side heat exchanger 23, and then discharging the heat source-side air to the outside. The heat source-side fan 34 is configured to supply to the heat source-side heat exchanger 23 the heat source-side air for cooling the refrigerant flowing through the heat source-side heat exchanger 23. The heat source-side fan 34 is driven to rotate by a heat source-side fan motor M34. The heat source-side fan 34 has an airflow volume controlled by adjusting the number of rotations of the heat source-side fan motor M34.

The receiver 24 temporarily stores therein the refrigerant condensed in the heat source-side heat exchanger 23. The receiver 24 is disposed at the middle of the heat source-side liquid refrigerant pipe 32.

The subcooler 25 is a heat exchanger for further cooling the refrigerant temporarily stored in the receiver 24. The subcooler 25 is disposed on the heat source-side liquid refrigerant pipe 32. Specifically, the subcooler 25 is disposed downstream of the receiver 24.

The heat source-side expansion valve 28 is an electric expansion valve whose opening degree is controllable. The heat source-side expansion valve 28 is disposed on the heat source-side liquid refrigerant pipe 32. Specifically, the heat source-side expansion valve 28 is disposed downstream of the subcooler 25.

The injection valve 27 is disposed on the injection pipe 26. Specifically, the injection valve 27 is disposed between a branched portion of the heat source-side liquid refrigerant pipe 32 and an inlet of the subcooler 25. The injection valve 27 is an electric expansion valve whose opening degree is controllable. The injection valve 27 decompresses, in accordance with its opening degree, the refrigerant flowing through the injection pipe 26 before the refrigerant flows into the subcooler 25.

The liquid-side shutoff valve 29 is a manual valve disposed at a joint between the heat source-side liquid refrigerant pipe 32 and the liquid-refrigerant connection pipe 6.

The gas-side shutoff valve 30 is a manual valve disposed at a joint between the suction-side refrigerant pipe 33 and the gas-refrigerant connection pipe 7.

The heat source unit 2 includes various sensors. In the heat source unit 2, specifically, a suction pressure sensor 36 and a discharge pressure sensor 37 are disposed around the compressor 21. The suction pressure sensor 36 is configured to detect a suction pressure that is a pressure of the refrigerant at the suction side of the compressor 21. The discharge pressure sensor 37 is configured to detect a discharge pressure that is a pressure of the refrigerant at the discharge side of the compressor 21. On the heat source-side liquid refrigerant pipe 32, a receiver outlet temperature sensor 38 is disposed between an outlet of the receiver 24 and the inlet of the subcooler 25. The receiver outlet temperature sensor 38 is configured to detect a receiver outlet temperature that is a temperature of the refrigerant at the outlet of the receiver 24. Moreover, a heat source-side air temperature sensor 39 is disposed around the heat source-side heat exchanger 23 or the heat source-side fan 34. The heat source-side air temperature sensor 39 is configured to detect a temperature of heat source-side air to be sucked into the heat source unit 2.

The heat source unit 2 also includes a heat source unit control unit 20 configured to control operations of the respective components constituting the heat source unit 2. The heat source unit control unit 20 includes a microcomputer including, for example, a central processing unit (CPU) and a memory. The heat source unit control unit 20 is connected to a first usage unit control unit 57 of the first usage unit 50 and a second usage unit control unit 67 of the second usage unit 60 via a communication line to exchange, for example, a control signal with the first usage unit control unit 57 and the second usage unit control unit 67.

(1-2) First Usage Unit 50

The first usage unit 50 is connected to the heat source unit 2 via the liquid-refrigerant connection pipe 6 and the gas-refrigerant connection pipe 7, and constitutes a part of the refrigerant circuit 10.

The first usage unit 50 includes a first usage-side expansion valve 54 and a first usage-side heat exchanger 52. The first usage unit 50 also includes: a first usage-side liquid refrigerant pipe 59 connecting a liquid-side end of the first usage-side heat exchanger 52 to the liquid-refrigerant connection pipe 6; and a first usage-side gas refrigerant pipe 58 connecting a gas-side end of the first usage-side heat exchanger 52 to the gas-refrigerant connection pipe 7.

The first usage-side expansion valve 54 is a restrictor functioning as means for decompressing the refrigerant to be supplied from the heat source unit 2. In this embodiment, the first usage-side expansion valve 54 is a thermostatic expansion valve including a feeler bulb, and operates in accordance with a change in temperature of the feeler bulb. In other words, the first usage-side expansion valve 54 has an opening degree automatically set in accordance with a change in temperature of the feeler bulb.

The first usage-side heat exchanger 52 functions as an evaporator for the low-pressure refrigerant in the refrigeration cycle to cool inside air (usage-side air). In this embodiment, the first usage unit 50 is used for cooling the interior of a door-equipped case such as a reach-in case; however, the use of the first usage unit 50 is not limited thereto.

The first usage unit 50 includes a first usage-side fan 53 for sucking usage-side air into the first usage unit 50, causing the usage-side air to exchange heat with the refrigerant in the first usage-side heat exchanger 52, and then supplying the usage-side air to the usage-side space. The first usage-side fan 53 is configured to supply to the first usage-side heat exchanger 52 the usage-side air for heating the refrigerant flowing through the first usage-side heat exchanger 52. The first usage-side fan 53 is driven to rotate by a first usage-side fan motor M53.

The first usage unit 50 also includes a first on-off valve 55 configured to interrupt an inflow of the refrigerant into the first usage unit 50. The first on-off valve 55 is disposed on the side of a liquid refrigerant inlet (the liquid-refrigerant connection pipe 6 side) of the first usage unit 50. Specifically, the first on-offvalve 55 is disposed closer to the liquid refrigerant inlet than the first usage-side heat exchanger 52 is. More specifically, the first on-off valve 55 is disposed closer to the liquid refrigerant inlet than the first usage-side expansion valve 54 is. In this embodiment, the first on-offvalve 55 is an electromagnetic valve whose open state and closed state are switchable. The first on-off valve 55 is switched to the closed state so as to interrupt an inflow of the refrigerant into the first usage unit 50, more specifically into the first usage-side heat exchanger 52. However, even the first on-off valve 55 is in the fully closed state, the valve opening degree may not be completely closed, and may be slightly opened as unintended in some instances. The first on-off valve 55 is normally in the open state.

The first usage unit 50 also includes a first check valve 51 configured to interrupt an inflow, that is, a backflow of the refrigerant into the first usage unit 50 through an outlet of the first usage unit 50. The first check valve 51 is disposed on the gas refrigerant outlet (the gas-refrigerant connection pipe 7 side) of the first usage unit 50. Specifically, the first check valve 51 is disposed closer to the gas refrigerant outlet than the first usage-side heat exchanger 52 is. The first check valve 51 permits a flow of the refrigerant from the first usage-side gas refrigerant pipe 58 toward the gas-refrigerant connection pipe 7. On the other hand, the first check valve 51 interrupts a flow of the refrigerant from the gas-refrigerant connection pipe 7 toward the first usage-side gas refrigerant pipe 58, more specifically toward a portion closer to the first usage-side heat exchanger 52 than the first check valve 51 is.

The first usage unit 50 also includes a first usage unit control unit 57 configured to control operations of the respective components constituting the first usage unit 50. The first usage unit control unit 57 includes a microcomputer including, for example, a CPU and a memory. The first usage unit control unit 57 is connected to the heat source unit control unit 20 via the communication line to exchange, for example, a control signal with the heat source unit control unit 20. The first usage unit control unit 57 is electrically connected to the first refrigerant leak sensor 81 to receive a signal from the first refrigerant leak sensor 81.

(1-3) Second Usage Unit 60

The second usage unit 60 is similar in configuration to the first usage unit 50. The second usage unit 60 is also connected to the heat source unit 2 via the liquid-refrigerant connection pipe 6 and the gas-refrigerant connection pipe 7, and constitutes a part of the refrigerant circuit 10. The second usage unit 60 and the first usage unit 50 are connected in parallel.

The second usage unit 60 includes a second usage-side expansion valve 64 and a second usage-side heat exchanger 62. The second usage unit 60 also includes: a second usage-side liquid refrigerant pipe 69 connecting a liquid-side end of the second usage-side heat exchanger 62 to the liquid-refrigerant connection pipe 6; and a second usage-side gas refrigerant pipe 68 connecting a gas-side end of the second usage-side heat exchanger 62 to the gas-refrigerant connection pipe 7.

The second usage-side expansion valve 64 is a restrictor functioning as means for decompressing the refrigerant to be supplied from the heat source unit 2. In this embodiment, as in the first usage-side expansion valve 54, the second usage-side expansion valve 64 is a thermostatic expansion valve including a feeler bulb, and operates in accordance with a change in temperature of the feeler bulb. In other words, the second usage-side expansion valve 64 has an opening degree automatically set in accordance with a change in temperature of the feeler bulb.

The second usage-side heat exchanger 62 functions as an evaporator for the low-pressure refrigerant in the refrigeration cycle to cool inside air (usage-side air). In this embodiment, the second usage unit 60 is used for cooling the interior of a doorless case with a large upper open end, such as an open case; however, the use of the second usage unit 60 is not limited thereto.

As in the first usage unit 50, the second usage unit 60 also includes a second usage-side fan 63 to be driven to rotate by a second usage-side fan motor M63.

The second usage unit 60 also includes a second on-off valve 65 configured to interrupt an inflow of the refrigerant into the second usage unit 60. The second on-off valve 65 is disposed on the side of a liquid refrigerant inlet (the liquid-refrigerant connection pipe 6 side) of the second usage unit 60. Specifically, the second on-off valve 65 is disposed closer to the liquid refrigerant inlet than the second usage-side heat exchanger 62 is. More specifically, the second on-off valve 65 is disposed closer to the liquid refrigerant inlet than the second usage-side expansion valve 64 is. In this embodiment, the second on-off valve 65 is an electromagnetic valve whose open state and closed state are switchable. The second on-off valve 65 is switched to the closed state so as to interrupt an inflow of the refrigerant into the second usage unit 60, more specifically into the second usage-side heat exchanger 62. However, even the second on-off valve 65 is in the fully closed state, the valve may not be completely closed, and may be slightly opened as unintended in some instances. The second on-off valve 65 is normally in the open state.

The second usage unit 60 also includes a second check valve 61 configured to interrupt an inflow, that is, a backflow of the refrigerant flowing into the second usage unit 60 through an outlet of the second usage unit 60. The second check valve 61 is disposed on the side of the gas refrigerant outlet (the gas-refrigerant connection pipe 7 side) of the second usage unit 60. Specifically, the second check valve 61 is disposed closer to the gas refrigerant outlet than the second usage-side heat exchanger 62 is. The second check valve 61 permits a flow of the refrigerant from the second usage-side gas refrigerant pipe 68 toward the gas-refrigerant connection pipe 7. On the other hand, the second check valve 61 interrupts a flow of the refrigerant from the gas-refrigerant connection pipe 7 toward the second usage-side gas refrigerant pipe 68, more specifically toward the second usage-side heat exchanger 62 from the second check valve 61.

The second usage unit 60 also includes a second usage unit control unit 67 configured to control operations of the respective components constituting the second usage unit 60. The second usage unit control unit 67 includes a microcomputer including, for example, a CPU and a memory. The second usage unit control unit 67 is connected to the heat source unit control unit 20 via the communication line to exchange, for example, a control signal with the heat source unit control unit 20. The second usage unit control unit 67 is electrically connected to the second refrigerant leak sensor 82 to receive a signal from the second refrigerant leak sensor 82.

(1-4) First Refrigerant Leak Sensor 81, Second Refrigerant Leak Sensor 82

The first refrigerant leak sensor 81 is configured to detect a refrigerant leak in the first usage unit 50. The second refrigerant leak sensor 82 is configured to detect a refrigerant leak in the second usage unit 60. The first refrigerant leak sensor 81 is disposed in a casing of the first usage unit 50. The second refrigerant leak sensor 82 is disposed in a casing of the second usage unit 60. Each of the first refrigerant leak sensor 81 and the second refrigerant leak sensor 82 to be used in this embodiment is a well-known general-purpose product.

Upon detection of a refrigerant leak, the first refrigerant leak sensor 81 (or the second refrigerant leak sensor 82) outputs an electric signal (hereinafter, referred to as a "refrigerant leak signal") indicative of occurrence of the refrigerant leak, to the first usage unit control unit 57 (or the second usage unit control unit 67) connected thereto.

(1-5) First Remote Controller 50*a*, Second Remote Controller 60*a*

The first remote controller 50*a* is an input device that causes a user of the first usage unit 50 to input various instructions for switching an operating state of the refrigeration apparatus 100. The first remote controller 50*a* also functions as a display device for displaying the operating state of the refrigeration apparatus 100 and predetermined notification information. The first remote controller 50*a* is connected to the first usage unit control unit 57 via a communication line to exchange signals with the first usage unit control unit 57.

As in the first remote controller 50*a*, the second remote controller 60*a* is an input device that causes a user of the second usage unit 60 to input various instructions for switching an operating state of the refrigeration apparatus 100, and a display device for displaying the operating state of the refrigeration apparatus 100 and predetermined notification information. The second remote controller 60*a* is connected to the second usage unit control unit 67 via a communication line to exchange signals with the second usage unit control unit 67.

(2) Details of Controller 70

In the refrigeration apparatus 100, the heat source unit control unit 20, the first usage unit control unit 57, and the second usage unit control unit 67 are connected via the communication lines to constitute the controller 70 for controlling operation of the refrigeration apparatus 100.

Figure 2:
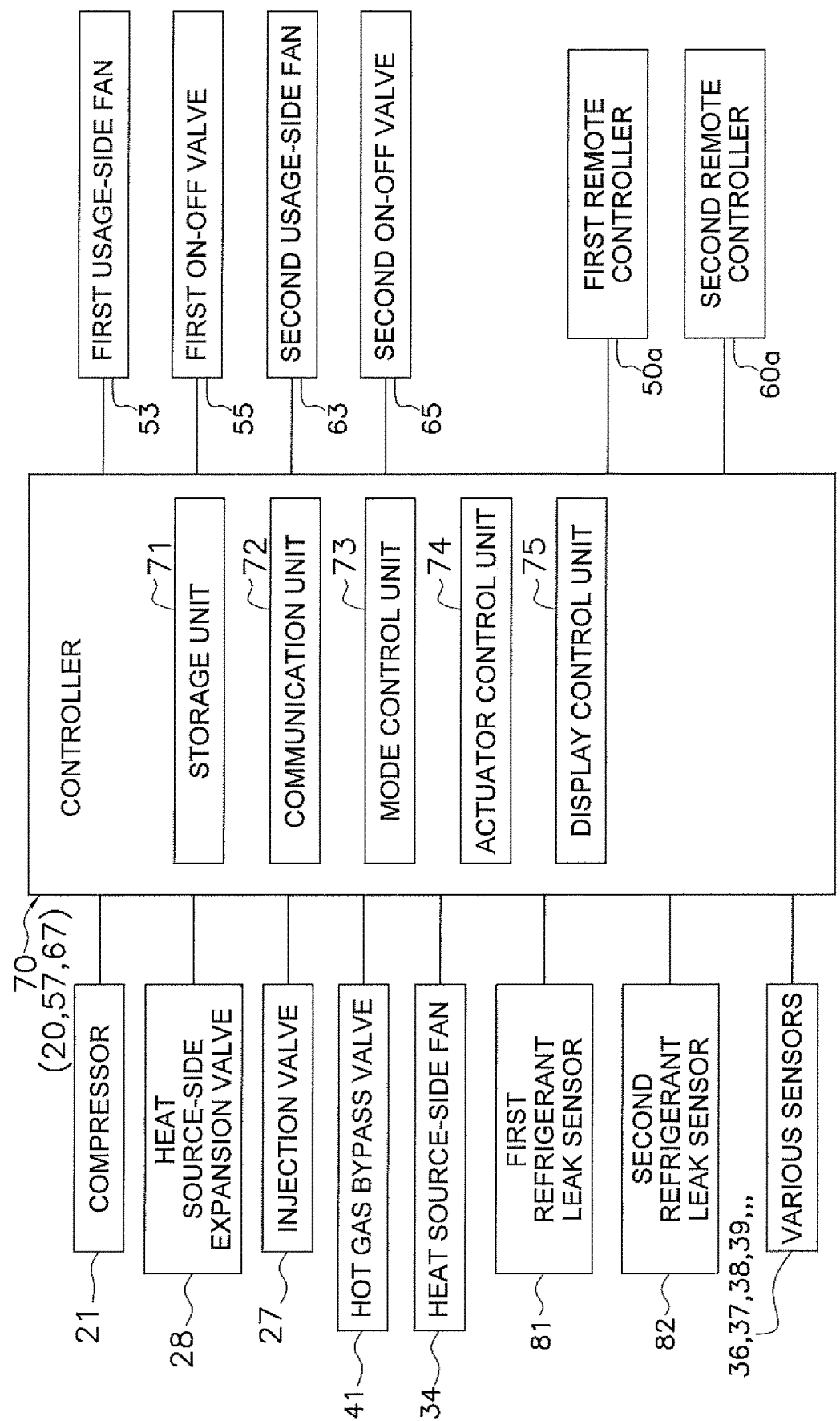
FIG. 2 is a schematic block diagram of a schematic configuration of a controller and components connected to the controller.

FIG. 2 is a schematic block diagram of a schematic configuration of the controller 70 and the components connected to the controller 70.

The controller 70 has a plurality of control modes, and controls the operation of the refrigeration apparatus 100 in accordance with a control mode in which the controller 70 is to be stated. Examples of the control modes of the controller 70 include: a normal operating mode in which the controller 70 is stated in a normal situation; and a refrigerant leak control mode in which the controller 70 is stated upon occurrence of a refrigerant leak.

The controller 70 is electrically connected to the actuators (i.e., the compressor 21 (the compressor motor M21), the heat source-side expansion valve 28, the injection valve 27, the hot gas bypass valve 41, and the heat source-side fan 34 (the heat source-side fan motor M34)) and the various sensors (i.e., the suction pressure sensor 36, the discharge pressure sensor 37, the receiver outlet temperature sensor 38, the heat source-side air temperature sensor 39, and the like) in the heat source unit 2. The controller 70 is also electrically connected to the actuators (i.e., the first usage-side fan 53 (the first usage-side fan motor M53), the first usage-side expansion valve 54, and the first on-offvalve 55) in the first usage unit 50. The controller 70 is also electrically connected to the actuators (i.e., the second usage-side fan 63

(the second usage-side fan motor M63), the second usage-side expansion valve 64, and the second on-off valve 65) in the second usage unit 60. The controller 70 is also electrically connected to the first refrigerant leak sensor 81, the second refrigerant leak sensor 82, the first remote controller 50*a*, and the second remote controller 60*a*.

The controller 70 mainly includes a storage unit 71, a communication unit 72, a mode control unit 73, an actuator control unit 74, and a display control unit 75. These units in the controller 70 are implemented in such a manner that the components in the heat source unit control unit 20 and/or each of the first usage unit control unit 57 and the second usage unit control unit 67 integrally function.

(2-1) Storage Unit 71

The storage unit 71 includes, for example, a read only memory (ROM), a random access memory (RAM), and a flash memory. The storage unit 71 has a volatile storage region and a nonvolatile storage region. The storage unit 71 stores therein a control program that defines processing to be performed by each unit of the controller 70. Also in the storage unit 71, the respective units of the controller 70 appropriately store predetermined information (e.g., values detected by the respective sensors, commands input to the first remote controller 50*a*, commands input to the second remote controller 60*a*) in a predetermined storage region.

(2-2) Communication Unit 72

The communication unit 72 is a functional unit that plays a role as a communication interface for exchanging signals with the respective components connected to the controller 70. The communication unit 72 receives a request from the actuator control unit 74, and transmits a predetermined signal to a designated one of the actuators. The communication unit 72 also receives signals from the various sensors 36 to 39, the first refrigerant leak sensor 81, the second refrigerant leak sensor 82, the first remote controller 50*a*, and the second remote controller 60*a*, and stores the received signals in the predetermined storage region of the storage unit 71.

(2-3) Mode Control Unit 73

The mode control unit 73 is a functional unit that switches a control mode, for example. In a state in which none of the first refrigerant leak sensor 81 and the second refrigerant leak sensor 82 detects a refrigerant leak, the mode control unit 73 sets the control mode at the normal operating mode.

When one of the first refrigerant leak sensor 81 and the second refrigerant leak sensor 82 detects a refrigerant leak, the mode control unit 73 switches the control mode to the refrigerant leak control mode according to the sensor, which has detected the refrigerant leak, of the first refrigerant leak sensor 81 and the second refrigerant leak sensor 82.

(2-4) Actuator Control Unit 74

The actuator control unit 74 controls, on the basis of the control program, the operations of the respective actuators (e.g., the compressor 21, a first on-off valve 55 and a second on-off valve 65) in the refrigeration apparatus 100, in accordance with a situation.

In the normal operating mode, for example, the actuator control unit 74 controls the number of rotations of the compressor 21, the number of rotations of the heat source-side fan 34, the number of rotations of the first usage-side fan 53, the number of rotations of the second usage-side fan 63, and the opening degree of the injection valve 27 in real time, in accordance with, for example, set temperatures and values detected by the various sensors. In the normal operating mode, the actuator control unit 74 brings the heat source-side expansion valve 28 into the fully open state. Also in the normal operating mode, the actuator control unit 74 sets a target value of a suction pressure in accordance with cooling loads to be required for the first usage unit 50 and the second usage unit 60, and controls the operating frequency of the compressor 21 so as to acquire the suction pressure with the target value. Also in the normal operating mode, the actuator control unit 74 brings the hot gas bypass valve 41 into the fully closed state to interrupt an inflow of the refrigerant into the hot gas bypass pipe 40.

In the refrigerant leak control mode, the actuator control unit 74 controls operations of the respective actuators so as to perform a predetermined operation. Specifically, as in the normal operating mode, the actuator control unit 74 continuously controls the operating frequency of the compressor 21 so as to acquire the suction pressure with the target value. In order to stop supply of the refrigerant to the usage unit at which the refrigerant leak occurs (hereinafter, referred to as a "leak unit") of the first usage unit 50 and the second usage unit 60, the actuator control unit 74 closes the on-off valve (i.e., the first on-off valve 55 or the second on-off valve 65). On the other hand, in order to continue a cooling operation using the heat exchanger of the usage unit at which no refrigerant leak occurs (hereinafter, referred to as a "non-leak unit") of the first usage unit 50 and the second usage unit 60, the actuator control unit 74 opens the on-off valve (i.e., the first on-off valve 55 or the second on-off valve 65). The actuator control unit 74 maintains a driven state of the compressor 21 immediately after detection of the refrigerant leak as described above. However, in order to reliably suppress a reduction in suction pressure such that the refrigerant pressure on the suction side of the compressor 21 with respect to the check valve (i.e., the first check valve 51 or the second check valve 61) of the leak unit is maintained to be higher than the refrigerant pressure at the check valve of the leak unit or on the side of the usage-side heat exchanger of the leak unit, the actuator control unit 74 causes the pressure of the high-pressure refrigerant on the discharge side of the compressor 21 to be applied to the suction side of the compressor 21 with respect to the check valve of the leak unit. In other words, the actuator control unit 74 opens the hot gas bypass valve 41. In the refrigerant leak control mode, the actuator control unit 74 lowers the opening degree of the heat source-side expansion valve 28 so as to reduce the pressure of the refrigerant flowing through the downstream side of the heat source-side expansion valve 28.

(2-5) Display Control Unit 75

The display control unit 75 is a functional unit that controls operations of the first remote controller 50*a* and the second remote controller 60*a* each serving as the display device.

The display control unit 75 causes each of the first remote controller 50*a* and the second remote controller 60*a* to output predetermined information in order that an operating state or information on a situation are displayed for an administrator.

For example, the display control unit 75 causes each of the first remote controller 50*a* and the second remote controller 60*a* to display thereon various kinds of information, such as set temperatures, during the cooling operation in the normal operating mode.

The display control unit 75 also causes each of the first remote controller 50*a* and the second remote controller 60*a* to display thereon information specifically indicating occurrence of a refrigerant leak and a usage unit, at which the refrigerant leak occurs, of the first usage unit 50 and the second usage unit 60, in the refrigerant leak control mode. The display control unit 75 also causes each of the first remote controller 50a and the second remote controller 60a to display thereon notification information indicating that a non-leak unit, which is an operable usage unit at which no refrigerant leak occurs, is continuously operated, and information urging a user to make a notification to a service engineer, in the refrigerant leak control mode.

(3) Flow of Refrigerant in Normal Operation Mode

Next, a description will be given of the flow of the refrigerant in the refrigerant circuit 10 in the normal operating mode.

During the operation, the refrigeration apparatus 100 performs the cooling operation (a refrigeration cycle operation) causing the refrigerant in the refrigerant circuit 10 to mainly circulate through the compressor 21, the heat source-side heat exchanger 23, the receiver 24, the subcooler 25, the heat source-side expansion valve 28, the usage-side expansion valves 54, 64, and the usage-side heat exchangers 52, 62 in this order.

When the cooling operation is started, the refrigerant is sucked into and compressed by the compressor 21, and then is discharged from the compressor 21, in the refrigerant circuit 10. In the cooling operation, the low pressure in the refrigeration cycle corresponds to the suction pressure to be detected by the suction pressure sensor 36, and the high pressure in the refrigeration cycle corresponds to the discharge pressure to be detected by the discharge pressure sensor 37.

The compressor 21 is subjected to capacity control according to the cooling load to be required for each of the first usage unit 50 and the second usage unit 60. Specifically, the operating frequency of the compressor 21 is controlled such that the suction pressure takes a target value set in accordance with the cooling load to be required for each of the first usage unit 50 and the second usage unit 60.

The gas refrigerant discharged from the compressor 21 flows into the heat source-side heat exchanger 23 through the gas-side end of the heat source-side heat exchanger 23, via the discharge-side refrigerant pipe 31.

In the normal operating mode, the hot gas bypass valve 41 is brought into the fully closed state to interrupt an inflow of the refrigerant into the hot gas bypass pipe 40.

When the gas refrigerant flows into the heat source-side heat exchanger 23 through the gas-side end of the heat source-side heat exchanger 23, the heat source-side heat exchanger 23 causes the gas refrigerant to exchange heat with the heat source-side air supplied by the heat source-side fan 34, thereby radiating heat, and then condenses the gas refrigerant to turn the gas refrigerant into the liquid refrigerant. The liquid refrigerant flows out of the heat source-side heat exchanger 23 through the liquid-side end of the heat source-side heat exchanger 23.

When the liquid refrigerant flows out of the heat source-side heat exchanger 23 through the liquid-side end of the heat source-side heat exchanger 23, then the liquid refrigerant flows into the receiver 24 through the inlet of the receiver 24 via a portion, extending from the heat source-side heat exchanger 23 to the receiver 24, of the heat source-side liquid refrigerant pipe 32. When the liquid refrigerant flows into the receiver 24, the receiver 24 temporarily stores therein the liquid refrigerant in a saturated state. Thereafter, the liquid refrigerant flows out of the receiver 24 through the outlet of the receiver 24.

When the liquid refrigerant flows out of the receiver 24 through the outlet of the receiver 24, then the liquid refrigerant flows into the subcooler 25 through the inlet of the heat source-side liquid refrigerant pipe 32 side of the subcooler 25 via a portion, extending from the receiver 24 to the subcooler 25, of the heat source-side liquid refrigerant pipe 32.

When the liquid refrigerant flows into the subcooler 25, the subcooler 25 causes the liquid refrigerant to exchange heat with the refrigerant flowing through the injection pipe 26, and further cools the liquid refrigerant, thereby bringing the liquid refrigerant into a subcooled state. The resultant liquid refrigerant flows out of the subcooler 25 through the outlet of the heat source-side expansion valve 28 side of the subcooler 25. The controller 70 controls the opening degree of the injection valve 27 such that the refrigerant flowing from the subcooler 25 toward the heat source-side expansion valve 28 has a predetermined positive degree of subcooling.

When the liquid refrigerant flows out of the subcooler 25 through the outlet of the heat source-side expansion valve 28 side of the subcooler 25, then the liquid refrigerant flows into the heat source-side expansion valve 28 via a portion, between the subcooler 25 and the heat source-side expansion valve 28, of the heat source-side liquid refrigerant pipe 32. At this time, the liquid refrigerant, which has flown out of the subcooler 25 through the outlet of the heat source-side expansion valve 28 side of the subcooler 25, is partly shunted to the injection pipe 26 from the portion, between the subcooler 25 and the heat source-side expansion valve 28, of the heat source-side liquid refrigerant pipe 32.

The refrigerant flowing through the injection pipe 26 is decompressed to have an intermediate pressure in the refrigeration cycle by the injection valve 27. The refrigerant decompressed by the injection valve 27 flows through the injection pipe 26, and then flows into the subcooler 25 through the inlet of the injection pipe 26 side of the subcooler 25. When the refrigerant flows into the subcooler 25 through the inlet of to the injection pipe 26 side of the subcooler 25, the subcooler 25 causes the refrigerant to exchange heat with the refrigerant flowing through the heat source-side liquid refrigerant pipe 32, and then heats the refrigerant to turn the refrigerant into the gas refrigerant. The refrigerant heated by the subcooler 25 flows out of the subcooler 25 through the outlet of the injection pipe 26 side of the subcooler 25, and then returns to the compressor 21 in the intermediate state of the compression process.

The heat source-side expansion valve 28 is brought into the fully open state in the normal operating mode. The liquid refrigerant, which has flown into the heat source-side expansion valve 28 via the heat source-side liquid refrigerant pipe 32, therefore passes through the heat source-side expansion valve 28 without being decompressed, and flows into each of the first usage unit 50 and the second usage unit 60 that are currently operated, via the liquid-side shutoff valve 29 and the liquid-refrigerant connection pipe 6.

When the refrigerant flows into the first usage unit 50, then the refrigerant flows into the first usage-side expansion valve 54 via the first on-off valve 55 and a part of the first usage-side liquid refrigerant pipe 59. When the refrigerant flows into the first usage-side expansion valve 54, then the refrigerant is decompressed to have the low pressure in the refrigeration cycle by the first usage-side expansion valve 54. Thereafter, the refrigerant flows into the first usage-side heat exchanger 52 through the liquid-side end of the first usage-side heat exchanger 52 via the first usage-side liquid refrigerant pipe 59. When the refrigerant flows into the first usage-side heat exchanger 52 through the liquid-side end of the first usage-side heat exchanger 52, the first usage-side heat exchanger 52 causes the refrigerant to exchange heat with the usage-side air supplied by the first usage-side fan 53, and evaporates the refrigerant to turn the refrigerant into the gas refrigerant. The resultant gas refrigerant flows out of the first usage-side heat exchanger 52 through the gas-side end of the first usage-side heat exchanger 52. When the gas refrigerant flows out of the first usage-side heat exchanger 52 through the gas-side end of the first usage-side heat exchanger 52, then the gas refrigerant flows to the gas-refrigerant connection pipe 7 via the first check valve 51 and the first usage-side gas refrigerant pipe 58.

As in the first usage unit 50, when the refrigerant flows into the second usage unit 60, then the refrigerant flows into the second usage-side expansion valve 64 via the second on-off valve 65 and a part of the second usage-side liquid refrigerant pipe 69. When the refrigerant flows into the second usage-side expansion valve 64, then the refrigerant is decompressed to have the low pressure in the refrigeration cycle by the second usage-side expansion valve 64. Thereafter, the refrigerant flows into the second usage-side heat exchanger 62 through the liquid-side end of the second usage-side heat exchanger 62 via the second usage-side liquid refrigerant pipe 69. When the refrigerant flows into the second usage-side heat exchanger 62 through the liquid-side end of the second usage-side heat exchanger 62, the second usage-side heat exchanger 62 causes the refrigerant to exchange heat with the usage-side air supplied by the second usage-side fan 63, and evaporates the refrigerant to turn the refrigerant into the gas refrigerant. The resultant gas refrigerant flows out of the second usage-side heat exchanger 62 through the gas-side end of the second usage-side heat exchanger 62. When the gas refrigerant flows out of the second usage-side heat exchanger 62 through the gas-side end of the second usage-side heat exchanger 62, then the gas refrigerant flows to the gas-refrigerant connection pipe 7 via the second check valve 61 and the second usage-side gas refrigerant pipe 68.

The refrigerant, which has flown out of the first usage unit 50, and the refrigerant, which has flown out of the second usage unit 60, merge with each other at the gas-refrigerant connection pipe 7, and then are sucked into the compressor 21 again, via the gas-side shutoff valve 30 and the suction-side refrigerant pipe 33.

(4) Flow of Processing by Controller 70 in Refrigerant Leak Control Mode

Figure 3:
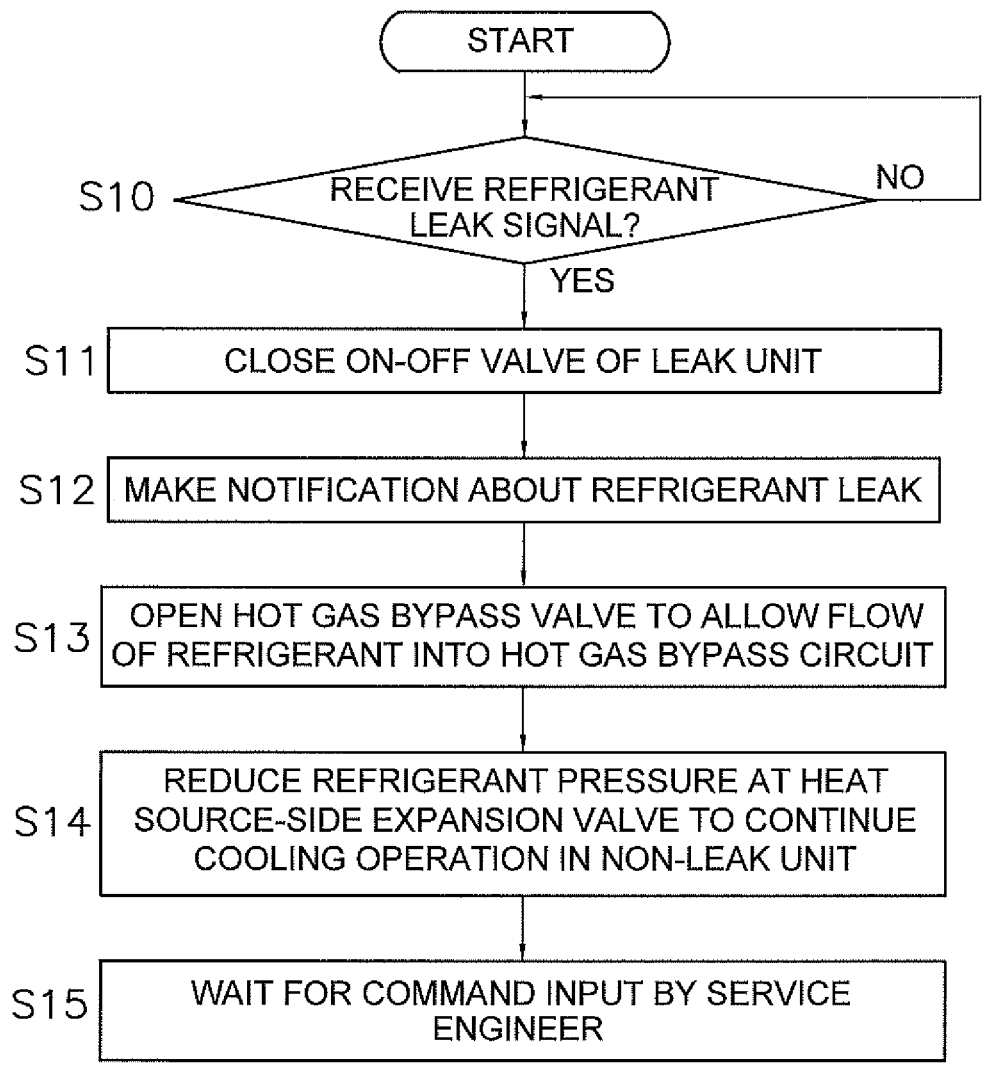
FIG. 3 is a flowchart of exemplary processing to be performed by the controller in a refrigerant leak control mode.

With reference to a flowchart of FIG. 3, next, a description will be given of exemplary processing to be performed by the controller 70 in a case where a refrigerant leak occurs in the normal operating mode.

The following description concerns an exemplary case where, of the first usage unit 50 and the second usage unit 60, the first usage unit 50 undergoes a refrigerant leak, that is, the first usage unit 50 corresponds to the leak unit while the second usage unit 60 continuously performs the cooling operation, that is, the second usage unit 60 corresponds to the non-leak unit. However, the same processing is performed irrespective of which usage unit undergoes a refrigerant leak.

In step S10, when the controller 70 receives a refrigerant leak signal from one of the first refrigerant leak sensor 81 and the second refrigerant leak sensor 82, that is, when it is assumed that one of the first usage unit 50 and the second usage unit 60 undergoes a refrigerant leak, the processing proceeds to step S11. When the controller 70 receives no refrigerant leak signal from the first refrigerant leak sensor 81 and the second refrigerant leak sensor 82, that is, when it is assumed that none of the first usage unit 50 and the second usage unit 60 undergoes a refrigerant leak, the controller 70 continues the normal operating mode, and makes a determination in step S10 again.

In step S11, the controller 70 closes the on-off valve of the usage unit (the leak unit), at which the refrigerant leak occurs, of the first usage unit 50 and the second usage unit 60, with the compressor 21 driven. In this example, the controller 70 closes the first on-off valve 55. The controller 70 also maintains at the open state the on-off valve of the usage unit (the non-leak unit), at which no refrigerant leak occurs, of the first usage unit 50 and the second usage unit 60. In this example, the controller 70 maintains the second on-off valve 65 at the open state. The processing then proceeds to step S12.

The controller 70 closes the on-off valve of the usage unit (the leak unit) at which the refrigerant leak occurs. However, the on-off valve of the leak unit may not be completely closed, so that the on-off valve may be slightly opened as unintended in some instances.

In step S12, the controller 70 causes each of the first remote controller 50a and the second remote controller 60a to make a notification about occurrence of the refrigerant leak and about which usage unit is the leak unit undergoing the refrigerant leak. Each of the first remote controller 50a and the second remote controller 60a may make a notification in the form of display on a screen and in the form of output by sound.

In step S13, the controller 70 opens the hot gas bypass valve 41 to allow the refrigerant to flow into the hot gas bypass pipe 40. For example, the valve opening degree of the hot gas bypass valve 41 may be controlled to be equal to a predetermined opening degree set in advance, or may be controlled such that a value of a suction pressure to be detected by the suction pressure sensor 36 is maintained at a value larger than an atmospheric pressure, or may be controlled such that a value detected by the suction pressure sensor 36 after the hot gas bypass valve 41 has opened is larger than that before the hot gas bypass valve 41 is opened; however, the control for the valve opening degree is not limited thereto. This configuration suppresses an inflow of the air in the atmosphere into the refrigerant circuit 10 through the leak spot. The processing then proceeds to step S14.

In step S14, the controller 70 lowers the valve opening degree of the heat source-side expansion valve 28 so as to reduce the pressure of the refrigerant flowing through the downstream side of the heat source-side expansion valve 28. In this embodiment, the controller 70 lowers the valve opening degree of the heat source-side expansion valve 28 such that the heat source-side expansion valve 28 has a predetermined valve opening degree smaller than the valve opening degree in the fully open state; however, the control for the valve opening degree is not limited thereto. This configuration enables continuation of the cooling operation in the non-leak unit while suppressing supply of the refrigerant to the leak unit. The processing then proceeds to step S15.

In step S15, the controller 70 is in a standby state until a service engineer who receives the notification about the refrigerant leak in step S12 rushes to the site. When the service engineer inputs a new command through the first remote controller 50a or the second remote controller 60a on the site, the controller 70 performs processing based on the basis of this command.

(5) Features of Refrigeration Apparatus 100

(5-1)

In this embodiment, upon occurrence of a refrigerant leak, the refrigeration apparatus 100 closes an on-off valve of a leak unit. Specifically, the refrigeration apparatus 100 closes the first on-off valve 55 upon occurrence of a refrigerant leak at the first usage unit 50, and closes the second on-off valve 65 upon occurrence of a refrigerant leak at the second usage unit 60. The refrigeration apparatus 100 thus suppresses additional supply of the refrigerant to the leak unit, and also suppresses an increase in leakage of the refrigerant in the leak unit.

(5-2)

In addition, the refrigeration apparatus 100 continues to open an on-off valve of a non-leak unit at which no refrigerant leak occurs. Specifically, the refrigeration apparatus 100 continues to open the second on-off valve 65 upon occurrence of the refrigerant leak at the first usage unit 50, and continues to open the first on-off valve 55 upon occurrence of the refrigerant leak at the second usage unit 60. The refrigeration apparatus 100 thus continues the cooling operation of the non-leak unit although stopping the cooling operation of the leak unit. With this configuration, at least the non-leak unit at which no refrigerant leak occurs continuously cools a target to be cooled. This configuration therefore suppresses occurrence of, for example, a deterioration of the target due to the stop of the cooling operation.

(5-3)

In a typical valve such as the first on-off valve 55 of the first usage unit 50 or the second on-off valve 65 of the second usage unit 60, the valve may not be completely closed even in a fully closed state, and may be slightly opened as unintended in some instances. If the valve is slightly opened as unintended, the refrigerant passes through an on-off valve of the leak unit to flow toward a usage-side heat exchanger, so that a refrigerant leak lasts as unintended.

The high refrigerant pressure at the on-off valve of the leak unit on the side of the liquid-refrigerant connection pipe 6 causes a large difference in pressure between the refrigerant before flowing into the on-off valve of the leak unit and the refrigerant which has passed through the on-off valve of the leak unit. Therefore the leakage of the refrigerant passing through the on-off valve of the leak unit tends to increase. In allowing continuous circulation of the refrigerant in the non-leak unit for the purpose of continuing the cooling operation in the non-leak unit, the refrigerant pressure is continuously applied to the on-off valve of the leak unit on the side of the liquid-refrigerant connection pipe 6.

In this respect, in the refrigeration apparatus 100 according to this embodiment, unlike the normal operating mode, in the refrigerant leak control mode, the controller 70 lowers the valve opening degree of the heat source-side expansion valve 28 so as to reduce the pressure of the refrigerant passing through the heat source-side expansion valve 28 (lowers the valve opening degree of the heat source-side expansion valve 28 to the predetermined valve opening degree in this embodiment). This configuration reduces the pressure of the refrigerant passing through the heat source-side expansion valve 28 and then flowing through the liquid-refrigerant connection pipe 6. This configuration therefore decreases the difference in pressure between the refrigerant before flowing into the on-off valve of the leak unit and the refrigerant which has passed through the on-off valve of the leak unit. In other words, since it is considered that an atmospheric pressure is applied to the on-off valve of the leak unit on the side of the leak spot, this configuration decreases a difference between the atmospheric pressure and the refrigerant pressure at the on-off valve of the leak unit on the side of the liquid-refrigerant connection pipe 6. With this configuration, if the on-off valve of the leak unit cannot be completely closed even in the fully closed state, the refrigeration apparatus 100 can reduce the supply of the refrigerant flowing toward the leak spot via the on-off valve of the leak unit. This configuration hardly causes a glitch due to an increase in leakage of the refrigerant in the leak unit. For example, in a case of using a combustible refrigerant, this configuration prolongs a time until a concentration of the leaking refrigerant increases to reach a combustible range. In addition, this configuration easily ensures a time until a service engineer arrives at the site.

In addition, the refrigeration apparatus 100 lowers the valve opening degree of the heat source-side expansion valve 28, thereby reducing the pressure of the refrigerant radiating heat in the heat source-side heat exchanger 23 and flowing toward each of the usage units 50 and 60. This configuration eliminates a necessity of significantly reducing the pressure of the refrigerant in causing the refrigerant to radiate heat in the heat source-side heat exchanger 23, that is, the pressure of the refrigerant flowing through the heat source-side heat exchanger 23 serving as a radiator.

(5-4)

In this embodiment, when the refrigeration apparatus 100 lowers the valve opening degree of the heat source-side expansion valve 28 thereby reducing the pressure of the refrigerant flowing from the heat source-side expansion valve 28 toward the non-leak unit, the subcooler 25 subcools the refrigerant before flowing into the heat source-side expansion valve 28. This configuration suppresses a flush of the refrigerant decompressed in the heat source-side expansion valve 28, and facilitates supply of the liquid-phase refrigerant to the non-leak unit.

(5-5)

In addition, the refrigerant continuously supplied to the non-leak unit evaporates in the usage-side heat exchanger of the non-leak unit, flows out of the non-leak unit, and flows toward the suction side of the compressor 21 again. In the leak unit, the check valve disposed on the suction side of the compressor 21 suppresses an inflow of the refrigerant into the leak unit even when the refrigerant flows from the non-leak unit toward the suction side of the compressor 21. This configuration also suppresses an increase in leakage of the refrigerant in the leak unit.

(5-6)

In this embodiment, upon occurrence of a refrigerant leak, the refrigeration apparatus 100 opens the hot gas bypass valve 41 to cause the refrigerant to flow through the hot gas bypass pipe 40. The refrigeration apparatus 100 thus increases the refrigerant pressure by causing the high pressure of the discharge refrigerant from the compressor 21 to be applied to a portion between the check valve of the leak unit and the suction side of the compressor 21. The refrigeration apparatus 100 thus avoids a situation in which the refrigerant pressure at the portion between the check valve of the leak unit and the suction side of the compressor 21 becomes lower than the refrigerant pressure at the refrigerant leak spot upstream of the check valve of the leak unit (i.e., the usage-side gas refrigerant pipe, the usage-side heat exchanger, the usage-side liquid refrigerant pipe, the usage-side expansion valve). The refrigeration apparatus 100 also suppresses a situation in which the air flows through the leak spot of the leak unit into the refrigerant circuit 10. This configuration suppresses damage to a device such as the compressor 21 which may be caused if the air flows into the refrigerant circuit 10.

(6) Modifications

The foregoing embodiment may be appropriately modified as described in the following modifications. It should be noted that these modifications are applicable in conjunction with other modifications insofar as there are no inconsistencies.

(6-1) Modification A

According to the foregoing embodiment, the refrigeration apparatus 100 includes the first usage unit 50 and the second usage unit 60. In the first usage unit 50, the first on-off valve 55 and the thermostatic first usage-side expansion valve 54 are disposed on the side of the refrigerant inlet of the first usage-side heat exchanger 52. In the second usage unit 60, the second on-offvalve 65 and the thermostatic second usage-side expansion valve 64 are disposed on the side of the refrigerant inlet of the second usage-side heat exchanger 62.

Figure 4:
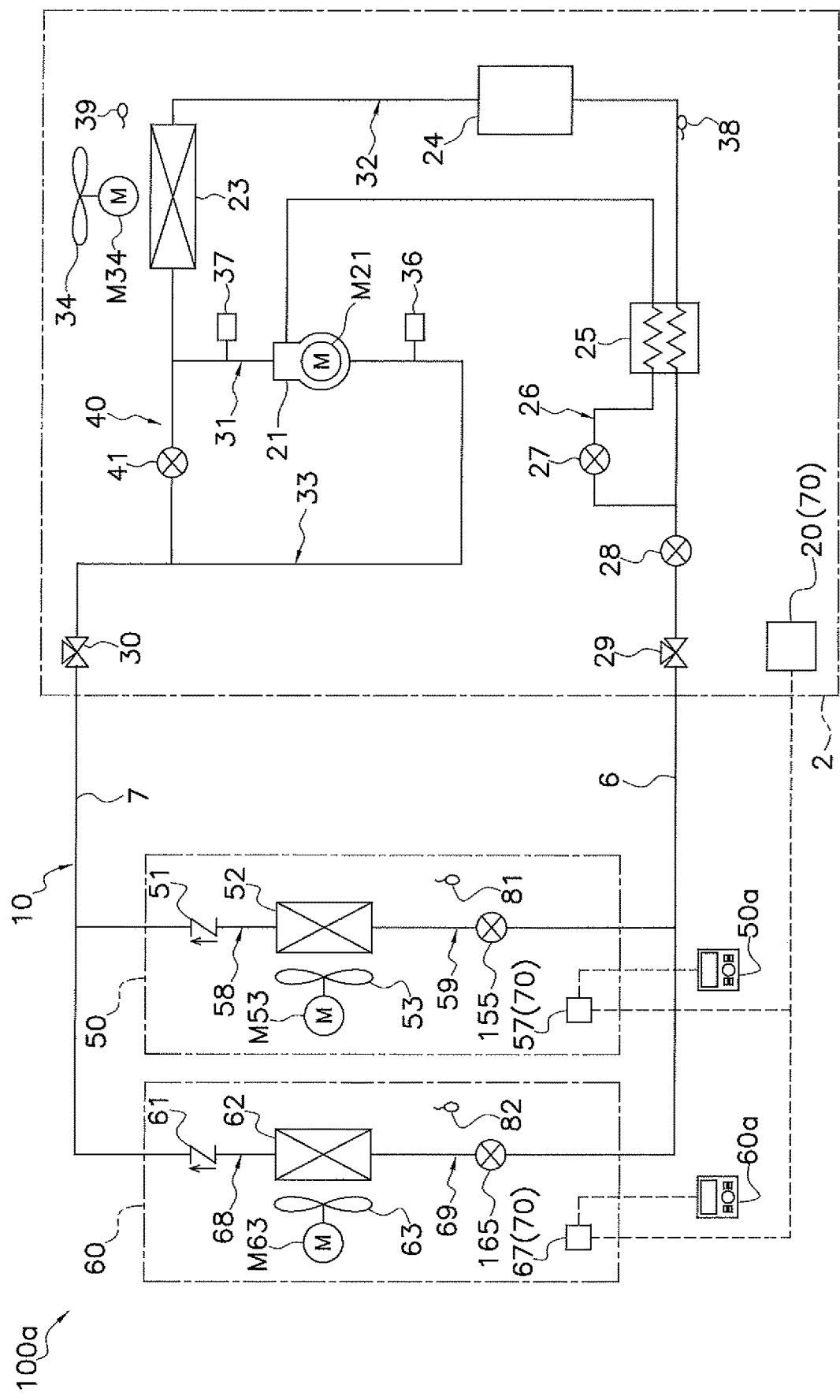
FIG. 4 is a general configuration diagram of a refrigeration apparatus including a refrigerant circuit according to Modification A.

As illustrated in FIG. 4, alternatively, a refrigeration apparatus 100a may include: a first usage-side electronic expansion valve 155 provided in place of the first on-off valve 55 and the thermostatic first usage-side expansion valve 54; and a second usage-side electronic expansion valve 165 provided in place of the second on-off valve 65 and the thermostatic second usage-side expansion valve 64.

Each of the first usage-side electronic expansion valve 155 and the second usage-side electronic expansion valve 165 is electrically connected to a controller 70, and the controller 70 controls the opening degree of each of the first usage-side electronic expansion valve 155 and the second usage-side electronic expansion valve 165.

As to an expanding operation of each of the first usage-side electronic expansion valve 155 and the second usage-side electronic expansion valve 165 in a normal operating mode, the controller 70 appropriately adjusts the opening degree of each of the first usage-side electronic expansion valve 155 and the second usage-side electronic expansion valve 165. The refrigeration apparatus 100a thus produces advantageous effects similar to those of the refrigeration apparatus 100 according to the foregoing embodiment.

In addition, as to an operation of each of the first usage-side electronic expansion valve 155 and the second usage-side electronic expansion valve 165 in a refrigerant leak control mode, the controller 70 fully closes either the first usage-side electronic expansion valve 155 or the second usage-side electronic expansion valve 165 in a leak unit. In other words, the controller 70 sets at a minimum the opening degree of either the first usage-side electronic expansion valve 155 or the second usage-side electronic expansion valve 165 in the leak unit. The controller 70 also causes either the first usage-side electronic expansion valve 155 or the second usage-side electronic expansion valve 165 in a non-leak unit to continuously perform the expanding operation. The refrigeration apparatus 100a thus produces advantageous effects similar to those of the refrigeration apparatus 100 according to the foregoing embodiment.

As in the refrigeration apparatus 100 according to the foregoing embodiment, the refrigeration apparatus 100a including the first usage-side electronic expansion valve 155 and the second usage-side electronic expansion valve 165 decreases a difference in pressure between the refrigerant before flowing into the electronic expansion valve (i.e., the first usage-side electronic expansion valve 155 or the second usage-side electronic expansion valve 165) of the leak unit and the refrigerant which has passed through the electronic expansion valve of the leak unit, thereby reducing the leakage of the refrigerant.

(6-2) Modification B

According to the foregoing embodiment, in the refrigerant leak control mode, the heat source-side expansion valve 28 reduces the refrigerant pressure, thereby reducing the pressure of the refrigerant to be supplied toward the non-leak unit (see step S14).

Figure 5:
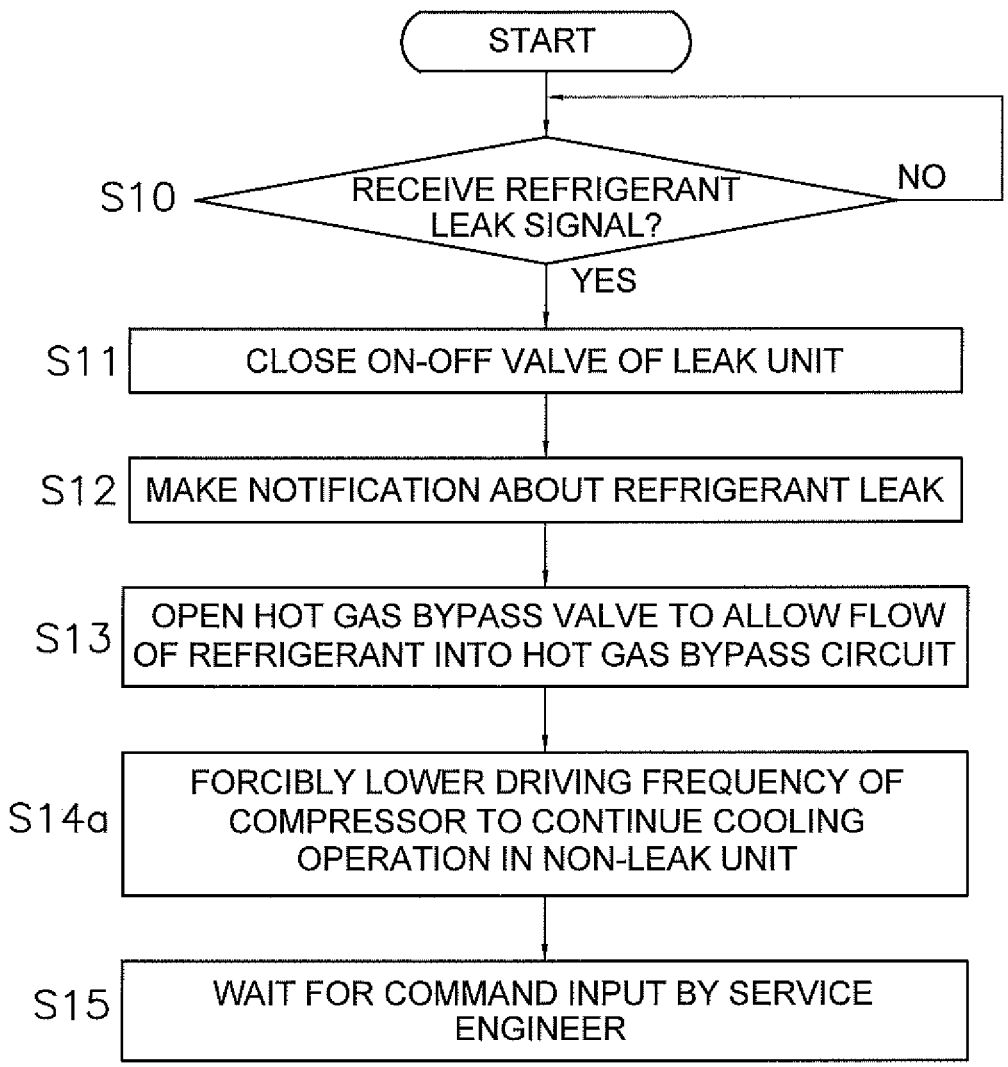
FIG. 5 is a flowchart of exemplary processing to be performed by a controller in a refrigerant leak control mode according to Modification B.

However, the method of reducing the pressure of the refrigerant to be supplied toward the non-leak unit is not limited thereto. As illustrated in FIG. 5, for example, processing of step S14a, in which the controller 70 forcibly lowers the driving frequency of the compressor 21, may be performed instead of the processing of step S14 in the foregoing embodiment to reduce the pressure of the refrigerant.

Specifically, the controller 70 may control the compressor 21 such that the driving frequency of the compressor 21 in the refrigerant leak control mode becomes lower than the driving frequency of the compressor 21 upon detection of a refrigerant leak by the first refrigerant leak sensor 81 or the second refrigerant leak sensor 82, for example. However, the method of lowering the driving frequency of the compressor 21 is not limited thereto. For example, the controller 70 may forcibly lower the driving frequency of the compressor 21 by a predetermined driving frequency. Alternatively, the controller 70 may lower the driving frequency of the compressor 21 as much as possible within a limit that causes a pressure difference to an extent that the heat source unit 2 and a non-leak unit form a refrigeration cycle.

This configuration also decreases a difference in pressure between the refrigerant before flowing into an on-off valve of a leak unit and the refrigerant which has passed through the on-off valve of the leak unit, thereby reducing the leakage of the refrigerant.

It should be noted that the controller 70 may concurrently perform the processing of step S14 in the foregoing embodiment and the processing of step S14a. Specifically, the controller 70 may decompress the refrigerant in the heat source-side expansion valve 28, and may forcibly lower the driving frequency of the compressor 21. This configuration also reduces the leakage of the refrigerant.

(6-3) Modification C

According to the foregoing embodiment, in the refrigerant leak control mode, the heat source-side expansion valve 28 reduces the refrigerant pressure, thereby reducing the pressure of the refrigerant to be supplied toward the non-leak unit (see step S14).

Figure 6:
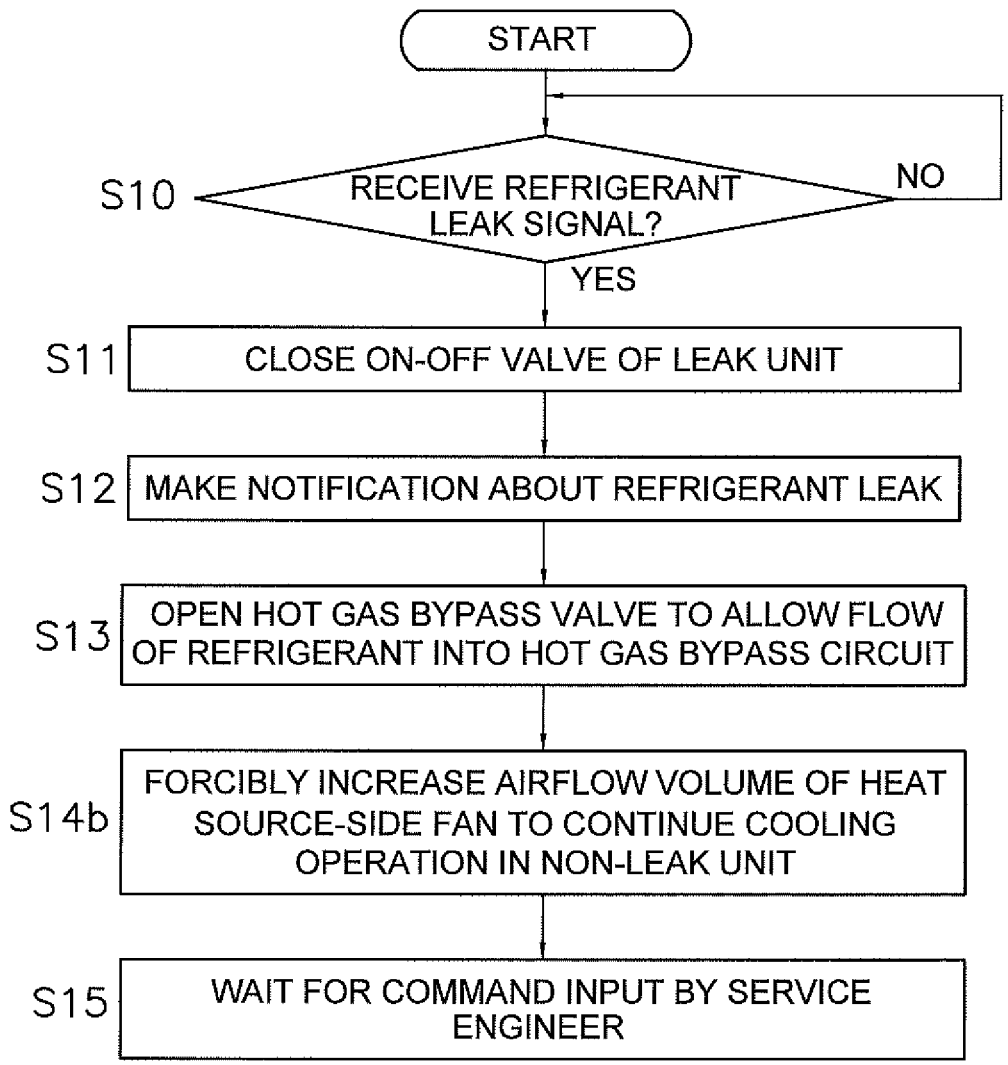
FIG. 6 is a flowchart of exemplary processing to be performed by a controller in a refrigerant leak control mode according to Modification C.

However, the method of reducing the pressure of the refrigerant to be supplied toward the non-leak unit is not limited thereto. As illustrated in FIG. 6, for example, processing of step S14b, in which the controller 70 forcibly increases the airflow volume of the heat source-side fan 34, may be performed instead of the processing of step S14 in the foregoing embodiment to reduce the pressure of the refrigerant.

Specifically, the controller 70 may control the heat source-side fan 34 such that the airflow volume of the heat source-side fan 34 in the refrigerant leak control mode becomes larger than the airflow volume of the heat source-side fan 34 upon detection of a refrigerant leak by the first refrigerant leak sensor 81 or the second refrigerant leak sensor 82, for example. However, the method of increasing the airflow volume of the heat source-side fan 34 is not limited thereto. For example, the controller 70 may forcibly increase the number of rotations of the heat source-side fan motor M34 by a predetermined number of rotations. Alternatively, the controller 70 may forcibly set the airflow volume of the heat source-side fan 34 at a maximum.

The increase in airflow volume of the heat source-side fan 34 promotes heat radiation from the refrigerant in the heat source-side heat exchanger 23. The refrigeration apparatus 100 therefore reduces the refrigerant pressure in the heat source-side heat exchanger 23, and decreases a difference in pressure between the refrigerant before flowing into an on-off valve of a leak unit and the refrigerant which has passed through the on-off valve of the leak unit. This configuration also reduces the leakage of the refrigerant.

It should be noted that the controller 70 may concurrently perform the processing of step S14 in the foregoing embodiment and the processing of step S14b. Specifically, the controller 70 may decompress the refrigerant in the heat source-side expansion valve 28, and may forcibly increase the airflow volume of the heat source-side fan 34. Alternatively, the controller 70 may concurrently perform all the processing of step S14 in the foregoing embodiment, the processing of step S14a in Modification B, and the processing of step S14b. Specifically, the controller 70 may decompress the refrigerant in the heat source-side expansion valve 28, may forcibly lower the driving frequency of the compressor 21, and may forcibly increase the airflow volume of the heat source-side fan 34. This configuration also reduces the leakage of the refrigerant.

(6-4) Modification D

According to the foregoing embodiment, in the refrigerant leak control mode, the refrigeration apparatus 100 lowers the valve opening degree of the heat source-side expansion valve 28 to the predetermined valve opening degree.

However, the extent of reducing the pressure of the refrigerant to be supplied toward the non-leak unit is not limited to an extent of pressure reduction by lowering the valve opening degree of the heat source-side expansion valve 28 to the predetermined valve opening degree. For example, the controller 70 may reduce the pressure of the refrigerant within a range where the refrigerant which has passed through the heat source-side expansion valve 28 is maintained at a liquid single phase state rather than a gas-liquid two-phase state. Alternatively, the controller 70 may reduce the pressure of the refrigerant such that the pressure takes a minimum value in the range described above. Still alternatively, the controller 70 may reduce the pressure of the refrigerant to a pressure larger than the minimum value in the range described above, by a pressure loss at the time when the refrigerant flows from the heat source-side expansion valve 28 to the non-leak unit (i.e., a pressure loss set in advance).

According to the foregoing embodiment, in addition, the controller 70 brings the heat source-side expansion valve 28 into the fully open state in the normal operating mode. However, the control for the valve opening degree is not limited thereto. Alternatively, the controller 70 may lower the valve opening degree of the heat source-side expansion valve 28 in the normal operating mode, and may further lower the valve opening degree of the heat source-side expansion valve 28 in the refrigerant leak control mode as compared to the normal operating mode.

(6-5) Modification E

According to the foregoing embodiment, the refrigeration apparatus 100 includes the hot gas bypass pipe 40.

However, the refrigeration apparatus 100 does not necessarily include the hot gas bypass pipe 40. In addition, the refrigeration apparatus 100 does not necessarily perform the processing of step S13 in the foregoing embodiment, that is, the processing of causing the refrigerant to flow into the hot gas bypass pipe 40.

(6-6) Modification F

According to the foregoing embodiment, the refrigeration apparatus 100 includes the injection pipe 26 for injecting the refrigerant into the compressor 21 in the intermediate state of the compression process.

Alternatively, the refrigeration apparatus 100 may include an injection pipe for injecting the refrigerant toward the suction side of the compressor 21, in place of the injection pipe 26 described in the foregoing embodiment.

(6-7) Modification G

According to the foregoing embodiment, the first refrigerant leak sensor 81 and the second refrigerant leak sensor 82 are disposed to detect a refrigerant leak at each usage unit 50, 60. If a refrigerant leak in each usage unit 50, 60 is detectable without the refrigerant leak sensor 81, 82, however, the refrigeration apparatus 100 does not necessarily include the refrigerant leak sensor 81, 82.

For example, each usage unit 50, 60 includes a sensor such as a refrigerant pressure sensor or a refrigerant temperature sensor. If a refrigerant leak in each usage unit 50, 60 is independently detectable on the basis of a change of a value detected by such a sensor, the refrigerant leak sensor 81, 82 may be omitted.

(6-8) Modification H

According to the foregoing embodiment, the refrigeration apparatus 100 is configured to cool, for example, the interior of a cold storage warehouse or the interior of a showcase in a store.

However, the use of the refrigeration apparatus 100 is not limited thereto. For example, the refrigeration apparatus 100 may be configured to cool the interior of a container for transportation. Alternatively, the refrigeration apparatus 100 may be an air conditioning system (an air conditioner) that achieves air conditioning by cooling the interior of a building or the like.

(6-9) Modification I

According to the foregoing embodiment, R32 is employed as a refrigerant that circulates through the refrigerant circuit 10.

However, the refrigerant for use in the refrigerant circuit 10 is not limited thereto. For example, HFO1234yf, HFO1234ze, and a mixture thereof may be employed in place of R32 for the refrigerant circuit 10. Alternatively, a hydrofluorocarbon (HFC) refrigerant such as R407C or R410A may be employed for the refrigerant circuit 10. Still alternatively, a combustible refrigerant such as propane or a toxic refrigerant such as ammonia may be employed for the refrigerant circuit 10.

INDUSTRIAL APPLICABILITY

The present invention is applicable to a refrigeration apparatus.

REFERENCE SIGNS LIST

2: heat source unit
6: liquid-refrigerant connection pipe
7: gas-refrigerant connection pipe
10: refrigerant circuit
20: heat source unit control unit
21: compressor
23: heat source-side heat exchanger
24: receiver
25: subcooler (subcooling heat exchanger)
26: injection pipe (subcooling pipe)
27: injection valve (subcooling expansion valve)
28: heat source-side expansion valve
34: heat source-side fan
36: suction pressure sensor
37: discharge pressure sensor
40: hot gas bypass pipe
41: hot gas bypass valve
50: first usage unit 51: first check valve
52: first usage-side heat exchanger
54: first usage-side expansion valve
55: first on-off valve (usage-side valve)
57: first usage unit control unit
58: first usage-side gas refrigerant pipe
59: first usage-side liquid refrigerant pipe
60: second usage unit
61: second check valve
62: second usage-side heat exchanger
64: second usage-side expansion valve
65: second on-off valve (usage-side valve)
67: second usage unit control unit
68: second usage-side gas refrigerant pipe
69: second usage-side liquid refrigerant pipe
70: controller (control unit)
81: first refrigerant leak sensor
82: second refrigerant leak sensor
100, 100a: refrigeration apparatus
155: first usage-side electronic expansion valve
165: second usage-side electronic expansion valve

CITATION LIST

Patent Literature

Patent Literature 1: JP 2002-228281 A

The invention claimed is:

1. A refrigeration apparatus comprising:
a heat source unit including a compressor, a heat source-side heat exchanger and a heat source-side expansion valve configured to reduce a pressure of the refrigerant radiating heat in the heat source-side heat exchanger;
a plurality of usage units connected to the heat source unit in parallel via a liquid-refrigerant connection pipe and a gas-refrigerant connection pipe; and
a controller,
   wherein each of the usage units includes:
   a usage-side heat exchanger; and
   a usage-side valve disposed closer to the liquid-refrigerant connection pipe than the usage-side heat exchanger is, and
when one of the usage units is in a refrigerant leak situation satisfying a predetermined condition, the controller
closes a usage-side valve of a leak unit which is the usage unit satisfying the predetermined condition,
continues to open a usage-side valve of a non-leak unit being operated at a time when the leak unit satisfies the predetermined condition among one or more non-leak unit which is the usage unit not satisfying the predetermined condition, and
performs pressure control to reduce a refrigerant pressure at a portion on the side of the liquid-refrigerant connection pipe with respect to each usage-side valve below a refrigerant pressure at the portion at the time when the leak unit satisfies the predetermined condition,
wherein
the controller further performs the pressure control by controlling the heat source-side expansion valve such that an extent of decompression in the heat source-side expansion valve after the leak unit has satisfied the predetermined condition is greater than an extent of decompression in the heat source-side expansion valve at the time when the leak unit satisfies the predetermined condition, and
the controller further performs the pressure control while keeping the usage-side heat exchanger of the non-leak unit functioning as an evaporator.

2. The refrigeration apparatus according to claim 1, further comprising:
a subcooling pipe configured to shunt the refrigerant radiating heat in the heat source-side heat exchanger, from a refrigerant passage through which the refrigerant flows toward each of the usage units, and configured to guide the refrigerant to the compressor;
a subcooling expansion valve disposed at a middle of the subcooling pipe and configured to decompress the refrigerant passing therethrough; and
a subcooling heat exchanger configured to cause the refrigerant decompressed by the subcooling expansion valve, of the refrigerant flowing through the subcooling pipe to exchange heat with the refrigerant flowing through the refrigerant passage.

3. A refrigeration apparatus comprising:
a heat source unit including a compressor and a heat source-side heat exchanger;
a plurality of usage units connected to the heat source unit in parallel via a liquid-refrigerant connection pipe and a gas-refrigerant connection pipe; and
a controller,
wherein
   each of the usage units includes:
   a usage-side heat exchanger; and
   a usage-side valve disposed closer to the liquid-refrigerant connection pipe than the usage-side heat exchanger is, and
   when one of the usage units is in a refrigerant leak situation satisfying a predetermined condition, the controller
   closes a usage-side valve of a leak unit which is the usage unit satisfying the predetermined condition,
   continues to open a usage-side valve of a non-leak unit being operated at a time when the leak unit satisfies the predetermined condition among one or more non-leak unit which is the usage unit not satisfying the predetermined condition, and
   performs pressure control to reduce a refrigerant pressure at a portion on the side of the liquid-refrigerant connection pipe with respect to each usage-side valve below a refrigerant pressure at the portion at the time when the leak unit satisfies the predetermined condition,
wherein
   the controller further performs the pressure control by controlling the compressor such that a driving frequency of the compressor after the leak unit has satisfied the predetermined condition is lower than a driving frequency of the compressor at the time when the leak unit satisfies the predetermined condition and
   the controller further performs the pressure control while keeping the usage-side heat exchanger of the non-leak unit functioning as an evaporator.

4. A refrigeration apparatus comprising:
a heat source unit including a compressor, a heat source-side heat exchanger and a heat source-side fan configured to provide an air flow for the heat source-side heat exchanger;
a plurality of usage units connected to the heat source unit in parallel via a liquid-refrigerant connection pipe and a gas-refrigerant connection pipe; and
a controller, wherein
  each of the usage units includes:
    a usage-side heat exchanger; and
    a usage-side valve disposed closer to the liquid-refrigerant connection pipe than the usage-side heat exchanger is, and
    when one of the usage units is in a refrigerant leak situation satisfying a predetermined condition,
    the controller
      closes a usage-side valve of a leak unit which is the usage unit satisfying the predetermined condition,
      continues to open a usage-side valve of a non-leak unit being operated at a time when the leak unit satisfies the predetermined condition among one or more non-leak unit which is the usage unit not satisfying the predetermined condition, and
      performs pressure control to reduce a refrigerant pressure at a portion on the side of the liquid-refrigerant connection pipe with respect to each usage-side valve below a refrigerant pressure at the portion at the time when the leak unit satisfies the predetermined condition,
  wherein
    the controller further performs the pressure control by controlling the heat source-side fan such that an airflow volume of the heat source-side fan after the leak unit has satisfied the predetermined condition is larger than an airflow volume of the heat source-side fan at the time when the leak unit satisfies the predetermined condition, and
    the controller further performs the pressure control while keeping the usage-side heat exchanger of the non-leak unit functioning as an evaporator.

\* \* \* \* \*